July 15, 1924.

C. NURNBERG

THERMOMETER AND CASING THEREFOR

Filed Oct. 16, 1922

1,501,801

WITNESSES

INVENTOR
C. Nurnberg
BY
ATTORNEYS

Patented July 15, 1924.

1,501,801

UNITED STATES PATENT OFFICE.

CHARLES NURNBERG, OF BROOKLYN, NEW YORK.

THERMOMETER AND CASING THEREFOR.

Application filed October 16, 1922. Serial No. 594,837.

*To all whom it may concern:*

Be it known that I, CHARLES NURNBERG, a citizen of the United States, and a resident of the city of New York, borough of Brooklyn, in the county of Kings and State of New York, have invented a new and Improved Thermometer and Casing Therefor, of which the following is a full, clear, and exact description.

This invention relates to improvements in casings for thermometers and the like and is designed particularly as an improvement over my former Patent No. 900,580, granted October 6th, 1908.

In the above mentioned patent there is shown a clinical thermometer having means on the body portion adjacent each end and extending laterally from the body portion for supporting the same out of contact with a table or other support and for preventing the thermometer from rolling when resting on a support. With thermometers of this and similar constructions it is customary to carry the same, when not in use, in a protective casing of considerably larger diameter than the thermometer itself. In thus carrying the thermometers they ofttimes become broken within the casing, or when being withdrawn or inserted therein due to the fact that nothing is provided for keeping the thermometer out of contact with the walls of the casing.

An object of the present invention is to secure all of the advantages obtained in my former construction and at the same time provide a casing or holder which will be effective in centrally positioning the thermometer therein out of contact with the sides and end of the casing.

Another object is to provide a closure for the thermometer casing which forms a part of the thermometer and which cooperates with means on the thermometer to prevent rolling thereof when resting on a table or other support.

The above and other objects will appear more clearly from the following detail description, when taken in connection with the accompanying drawing, which illustrate preferred embodiments of the inventive idea.

In the drawing—

Figure 1:
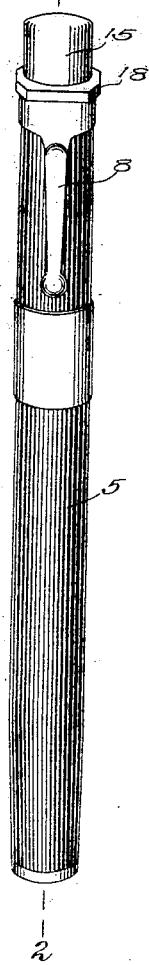
Figure 1 is a perspective view of one form of the invention.
Figure 2:
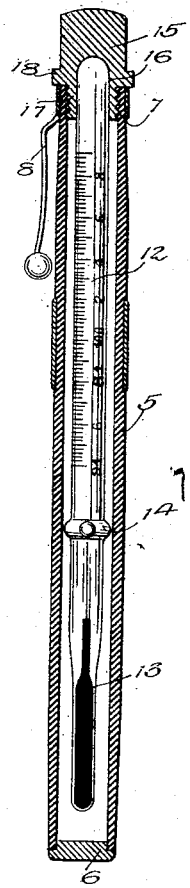
Figure 2 is a vertical longitudinal section on the line 2—2 of Figure 1.
Figure 3:
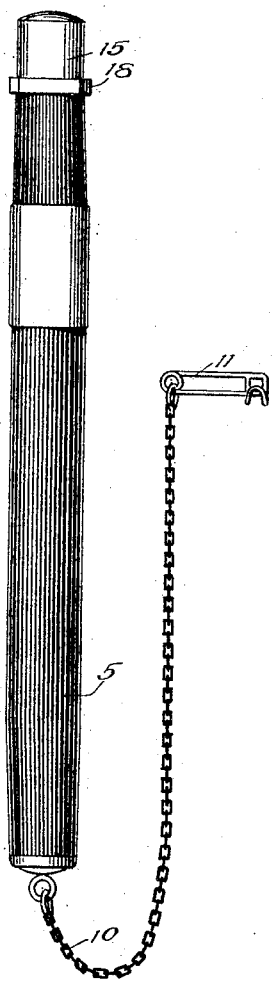
Figure 3 is a side elevation of another form of the invention.
Figure 4:
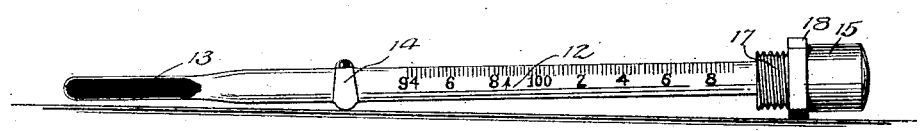
Figure 4 is a side elevation of the thermometer detached from its casing and resting on a support.

Referring more particularly to the drawing the numeral 5 indicates a casing of elongated cylindrical formation having a closed end 6 and an open internally screw threaded end 7. In the form of the invention illustrated in Figures 1 and 2, a spring clip 8 is secured to the casing 5 adjacent the end 7 thereof to provide a means for securing the casing in the pocket of the user. In the form shown in Figure 3, the clip 8 is dispensed with and in its stead a flexible connection, such as a chain 10, is secured at one end to the closed end 6 of the casing 5, while the other end of the chain is provided with a spring clasp 11, which may be secured to a garment to prevent loss of the casing from the pocket of the user.

The thermometer 12 employed in connection with the present invention is of a construction similar to that disclosed in the above mentioned patent in that the same is provided adjacent the bulb end 13 of the thermometer with a means, such as the projection 14 for maintaining the bulb end of the thermometer out of contact with a support when the thermometer is rested thereon.

The present invention contemplates the provision of additional means adapted to cooperate with the projection 14 to maintain the thermometer out of engagement with a support, which means also provides a closure for the open end 7 of the casing 5. As shown the closure member 15 is provided in the inner end thereof with a recess 16 for receiving one end of the thermometer 12 which is secured in said recess by means of any suitable material, such as a thin film of sealing wax, which will permit the thermometer to be readily removed in order that the same may be replaced should it become accidentally broken. The inner end 17 of the closure 15 is reduced and externally threaded to engage the interior threads of the end 7 of the casing, whereby the thermometer 12 will be centrally positioned within said casing and out of contact with the walls thereof. Intermediate the ends of the closure 15 the same is provided with an annular flange 18 having a plurality of plane or flat surfaces which form suitable grips for removing the closure and thermometer from the casing and one of which surfaces is in a plane parallel to the portion of the projection 14, which is designed to engage a support. The flange 18 is of such a width as to engage the end 7 of the casing 5 so that the inward movement of the closure 15 and thermometer 12 will be limited by said flange.

From the foregoing description it will be apparent that the invention provides a thermometer casing which may be readily and conveniently carried about the person of the user and also provides an effective means for maintaining the thermometer out of contact with a support and preventing rolling thereof, so that a reading of the thermometer may be made while the same is resting on said support.

What is claimed is:

In a device of the character described, the combination of a casing having an open end, a closure for said end of the casing having a portion insertable into and withdrawable from said end and also having a flange intermediate the ends thereof for limiting the inward movement of said closure, said flange being provided with a plurality of plane surfaces, said closure also having a centrally arranged recess in its inner end extending outwardly to a point medially the ends of the closure, and a thermometer having one end secured in said recess and held in spaced relation to the walls of said casing by said closure, said thermometer being provided with a projection cooperating with one of said plane surfaces to maintain said thermometer out of contact with a support when resting thereon and to prevent rolling of said thermometer on said support.

CHARLES NURNBERG.